(12) United States Patent
Reeves

(10) Patent No.: US 12,053,794 B2
(45) Date of Patent: Aug. 6, 2024

(54) FOOT CONTROLLED STAND UP ZERO TURN RADIUS UTILITY VEHICLE

(71) Applicant: David Allan Reeves, Lakeland, FL (US)

(72) Inventor: David Allan Reeves, Lakeland, FL (US)

( * ) Notice: Subject to any disclaimer, the term of this patent is extended or adjusted under 35 U.S.C. 154(b) by 817 days.

(21) Appl. No.: 17/101,062

(22) Filed: Nov. 23, 2020

(65) Prior Publication Data

US 2021/0170433 A1 Jun. 10, 2021

Related U.S. Application Data

(63) Continuation-in-part of application No. 15/988,948, filed on May 24, 2018, now Pat. No. 11,000,869,
(Continued)

(51) Int. Cl.
*B62D 51/02* (2006.01)
*B05B 9/00* (2006.01)
*B05B 9/04* (2006.01)
*B60L 15/20* (2006.01)
*B60L 50/60* (2019.01)
(Continued)

(52) U.S. Cl.
CPC ............ *B05B 9/007* (2013.01); *B05B 9/0403* (2013.01); *B60L 15/2036* (2013.01); *B60L 50/60* (2019.02); *B62D 1/02* (2013.01); *B62D 5/02* (2013.01); *B62D 11/06* (2013.01); *B62D 37/00* (2013.01); *B62D 51/001* (2013.01); *B62D 61/08* (2013.01); *B60L 2200/40* (2013.01); *B60L 2240/461* (2013.01); *B60L 2250/26* (2013.01); *Y02T 10/64* (2013.01); *Y02T 10/72* (2013.01)

(58) Field of Classification Search
CPC ... B05B 9/007; B05B 9/0403; B60L 15/2036; B60L 50/60; B60L 2200/40; B60L 2240/461; B60L 2250/26; B60L 50/16; B62D 1/02; B62D 11/06; B62D 37/00; B62D 51/001; B62D 51/02; B62D 61/08; Y02T 10/64; Y02T 10/72; Y02T 10/7072; Y02T 10/70
See application file for complete search history.

(56) References Cited

U.S. PATENT DOCUMENTS 6,371,228 B1 * 4/2002 Husted ................. A61G 5/1018
280/250.1
2003/0213626 A1 * 11/2003 Hafendorfer ........ B62D 11/001
180/6.48

* cited by examiner

*Primary Examiner* — Minnah L Seoh
*Assistant Examiner* — Marlon A Arce
(74) *Attorney, Agent, or Firm* — Cygnet IP Law, P.A.; Stephen W. Aycock, II

(57) ABSTRACT

Some implementations can include a zero turn radius utility vehicle that is operated in a standing position by an operator using foot controls provided on the utility vehicle. Accordingly, the operator's hands are free to operate handheld equipment (e.g., a line trimmer, edger, blower, etc.) while the operator controls the utility vehicle via the foot controls. Further, the utility vehicle may have a single third wheel (and no mower deck or other deck or protrusion) extending from the front of the vehicle frame so as to minimize any protrusions to the front of the vehicle, which can permit the operator to work on the ground in front of the utility vehicle using handheld equipment without interference from a mower deck, while remaining in a standing position on the utility vehicle and being able to simultaneously control the utility vehicle (via foot controls) and perform work with handheld equipment.

10 Claims, 20 Drawing Sheets

Related U.S. Application Data which is a continuation of application No. 15/255,958, filed on Sep. 2, 2016, now Pat. No. 10,046,798.

(51) Int. Cl.
*B62D 1/02* (2006.01)
*B62D 5/02* (2006.01)
*B62D 11/06* (2006.01)
*B62D 37/00* (2006.01)
*B62D 51/00* (2006.01)
*B62D 61/08* (2006.01)

(12) United States Patent

FOOT CONTROLLED STAND UP ZERO TURN RADIUS UTILITY VEHICLE

RELATED APPLICATIONS

This application is a continuation-in-part of U.S. application Ser. No. 15/988,948, entitled "Foot Controlled Stand Up Zero Turn Radius Utility Vehicle", and filed on May 24, 2018, which is a continuation of U.S. application Ser. No. 15/255,958, entitled "Foot Controlled Stand Up Zero Turn Radius Utility Vehicle", and filed on Sep. 2, 2016, which is now issued as U.S. Pat. No. 10,046,798, each of which is incorporated herein by reference in its entirety.

FIELD

Embodiments relate generally to utility vehicles, and, more particularly to a foot controlled stand up zero turn radius utility vehicle.

BACKGROUND

Some conventional utility vehicles may not be suitable for certain applications such as operating handheld equipment (e.g., line trimmer, edger, hedge trimmer, etc.) due to a need for some conventional vehicles to be operated by hand controls and/or due to the front of some conventional vehicles (e.g., a mower) having a platform or deck (e.g., for a mower blade or other equipment) extending out from the conventional vehicle such that operating handheld equipment to contact the ground (e.g., a line trimmer or edger) may be difficult or cumbersome.

One or more embodiments were conceived in light of the above-mentioned limitations or problems, among other things.

SUMMARY

Some implementations can include a zero turn radius (each drive wheel is independently controlled) utility vehicle that is operated in a standing position ("stand up") by an operator using foot controls provided on the utility vehicle. Accordingly, the operator's hands are free to operate handheld equipment (e.g., a line trimmer, edger, blower, etc.) while the operator controls the utility vehicle via the foot controls. Further, the utility vehicle may have a single third wheel (and no mower deck or other deck or protrusion) extending from the front of the vehicle frame so as to minimize any protrusions to the front, which can permit the operator to work on the ground in front of the utility vehicle using handheld equipment (e.g., line trimmer, edger, hedge trimmer, blower, etc.) without interference from a mower deck or the like, while remaining on the utility vehicle and being able to simultaneously control the utility vehicle (via foot controls) and perform work with handheld equipment.

Some implementations can include a utility vehicle comprising a frame having a single front caster wheel, a front operator support, a standing operation section, a rear operator support, a right rear drive wheel and a left rear drive wheel. The utility vehicle can also comprise an engine coupled to the frame and to a drive system configured to independently control respective speed and rotation direction of a left rear drive wheel and a right rear drive wheel. The utility vehicle can further comprise a foot control section disposed in the standing operation section having a left foot control, a stationary center portion and a right foot control, wherein the left and right foot controls are connected to the drive system, and wherein the left foot control controls the speed and direction of the left drive wheel and the right foot control controls the speed and direction of the right drive wheel. The stationary center portion can be elevated so as to extend above the left foot control and the right foot control.

The utility vehicle can also include a removable elevated standing platform having a standing section, railing, a first leg and a second leg. The first leg can be longer than the second leg. The utility vehicle can also include a sprayer system including a sprayer tank, a sprayer handle, a sprayer pump coupled to the tank and the sprayer handle. The utility vehicle can further comprise a sprayer handle holder disposed adjacent to the sprayer tank.

The utility vehicle can also include an accessory tray disposed on the rear operator support and extending toward the engine.

In some implementations, the engine can include a combustion engine and the utility vehicle can include a fuel tank coupled to the engine. In other implementations, the engine can include an electric motor and the utility vehicle can include a battery to power the electric motor.

The utility vehicle can also include an engine starter switch, a throttle control, and/or a brake control. The utility vehicle can further include a ballast weight disposed on an exterior of the front operator support.

The utility vehicle can also include an anti-tip device disposed on an exterior lower rear portion of the frame. The utility vehicle can include a trailer hitch disposed on an exterior lower rear portion of the frame.

DETAILED DESCRIPTION

It will be appreciated that the diagrams described herein are for illustration purposes and may not be to scale. Also, it will be appreciated that any dimensions described herein are example dimensions for illustration purposes and other dimensions may be used. Also, standard features of an engine and hydraulic drive system are not described herein for purposes of clarity of presenting the disclosed subject matter. A standard gasoline lawnmower engine can be used or a standard electric motor may be used. The hydraulic drive and an example foot control mechanism is described, for example, in U.S. Pat. No. 6,845,829, which is incorporated herein by reference.

Figure 1:
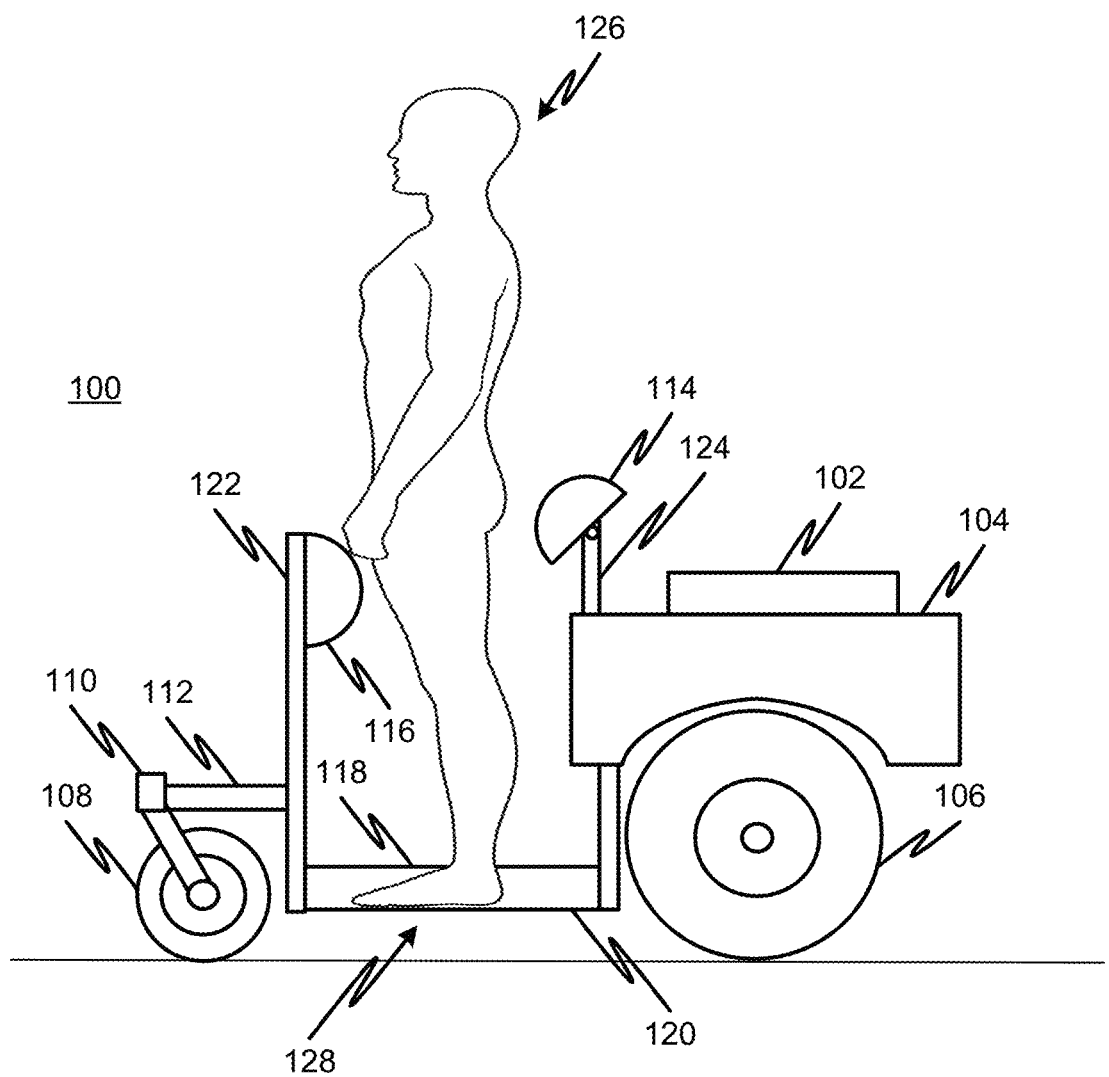
FIG. 1 is a diagram showing a side view of an example foot controlled zero turn radius stand up utility vehicle in accordance with some implementations.

FIG. 1 is a diagram showing a side view of an example foot controlled zero turn radius stand up utility vehicle in accordance with some implementations. In particular, a stand up zero turn utility vehicle with foot controls 100 can include an engine 102 (e.g., combustion engine or electric motor), a fuel tank (or battery) 104, a left side rear drive wheel 106, a right rear drive wheel (not shown in this view), a single front wheel 108, and a frame including: a front wheel caster 110, a front wheel support bracket 112, a rear driver support cushion 114, a front driver support cushion 116, a stationary section 118, a left foot control 120, a right foot control (not shown in this view), a front operator support 122, and a rear operator support 124. Some implementations can include dual front wheels that can have a smaller diameter than a single front wheel. A dual front wheel implementation can include two front wheel assemblies attached to the frame that are similar to the single front wheel assembly including 110 and 112, see, e.g., FIG. 11. The dual front wheels can be spaced apart and attached to the frame near respective sides.

Figure 2:
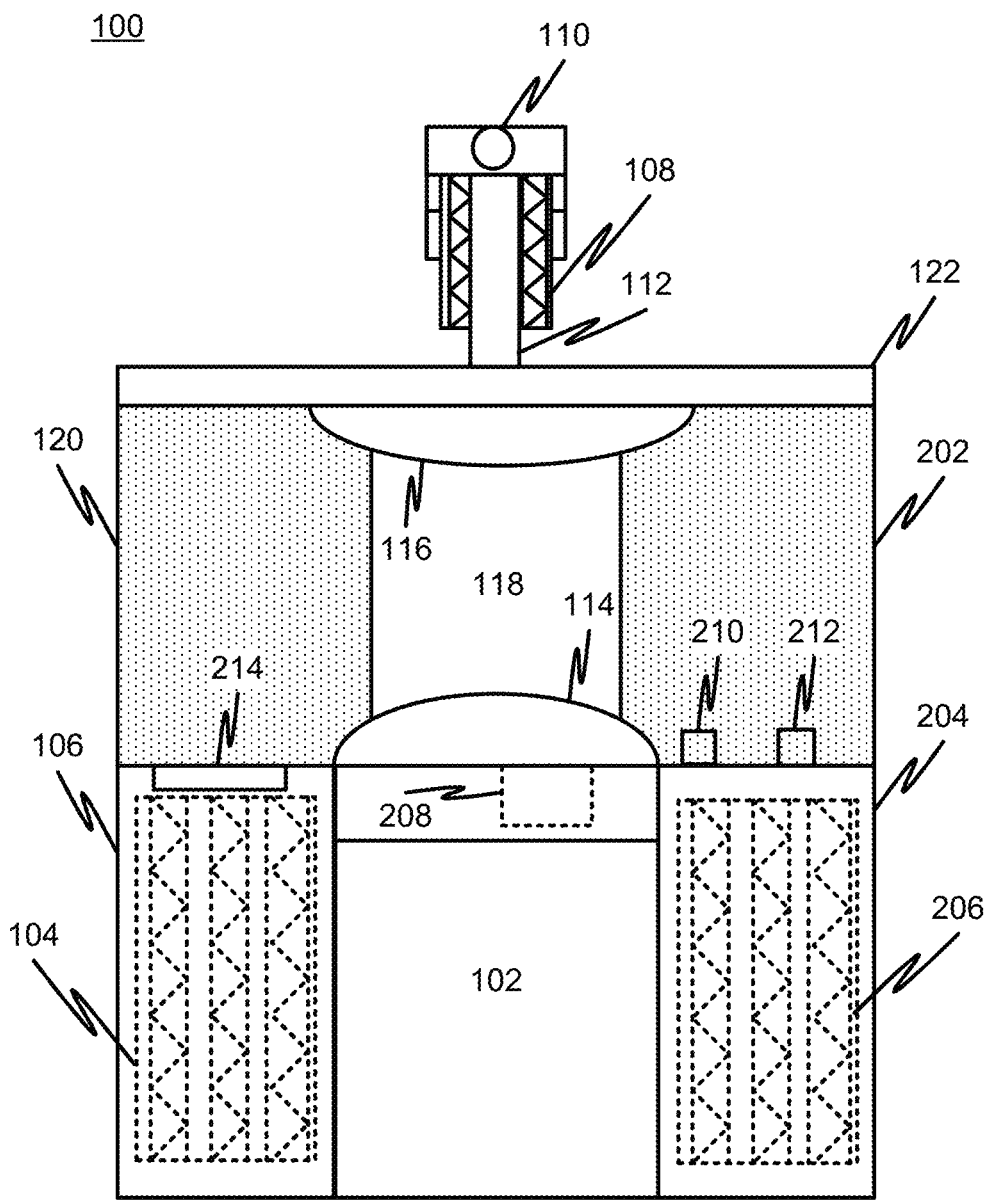
FIG. 2 is a diagram showing a top view of an example foot controlled zero turn radius stand up utility vehicle in accordance with some implementations.

In operation, an operator 126 stands in an essentially upright position within the standing operation section 128 (e.g., between the front operator support 122 and the rear operator support 124), sets the brake control (214, shown in FIG. 2), sets the throttle (210, shown in FIG. 2) and starts the engine using an ignition (or power) switch (212, shown in FIG. 2). Once the engine is running or (or powered on in the case of an electric motor), the operator can release the brake control (214) and cause the utility vehicle to move using the left and right foot controls as described in greater detail below. The operator 126 can support himself/herself using the front operator support 122 and front operator support cushion 116 and the rear operator support 124 and rear operator support cushion 114.

The ground clearance of the utility vehicle can be fixed or adjustable. In some implementation, the clearance between the bottom of the utility vehicle and the ground may be about 5.25 inches to permit the utility vehicle to move freely over lawns, such as those with St. Augustine grass, for example, while maintaining a relatively low center of gravity for stability.

An example utility vehicle may have overall dimensions of about 38.5 inches wide and about 54.5 inches long from the front of the front wheel to the rear of the vehicle, with a wheelbase of 35 inches. The front wheel can include a 13×5.00 tire and the rear drive wheels can include a wheel having a 20×7 or 18×8.50 tire, for example. The front wheel support bracket may extend about 12 inches from the front operator support 122, which may be about 27⅝ inches high measured from the ground. The top of the rear operator support cushion may be about 38 and ¾ inches from the ground. The operator standing section 128 may be about 18 and ¾ inches from front operator support to rear operator support. The engine section may be about 23 inches from front to rear.

FIG. 2 is a diagram showing a top view of an example foot controlled zero turn radius stand up utility vehicle in accordance with some implementations. In FIG. 2, the left foot control 202, sprayer tank 204, and the left rear drive wheel 206 are visible. Also shown in FIG. 2 is an accessory tray 208 that is recessed into the rear operator support 124.

Figure 3:
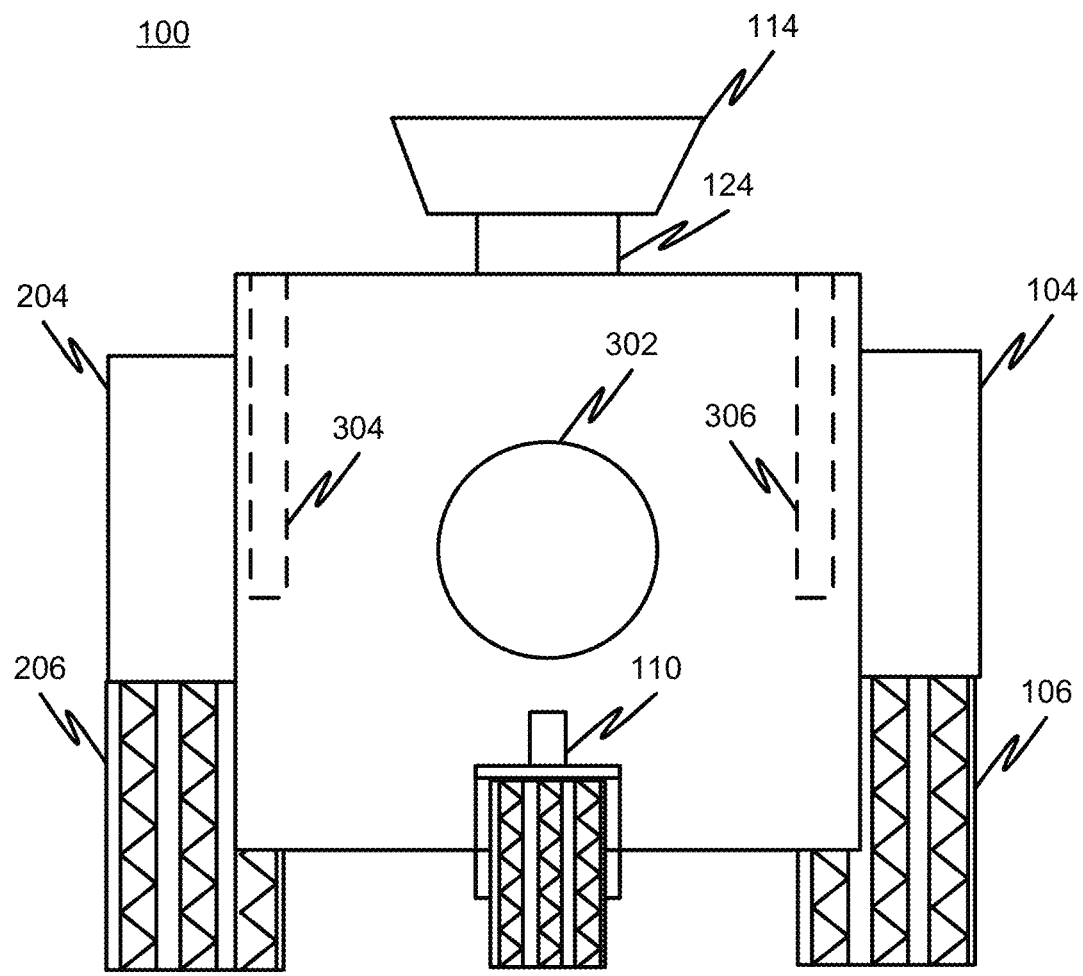
FIG. 3 is a diagram showing a front view of an example foot controlled zero turn radius stand up utility vehicle in accordance with some implementations.

FIG. 3 is a diagram showing a front view of an example foot controlled zero turn radius stand up utility vehicle in accordance with some implementations. In FIG. 3, a ballast weight 302 is shown attached to an exterior of the front operator support 122. The ballast weight 302 can be sized based on the specific implementations details of a utility vehicle and/or operator weight, height or other characteristics. Also, in FIG. 3, recesses 304 and 306 are shown. These recesses are provided for mounting a removable elevated standing platform as show in FIGS. 5-7.

Figure 4:
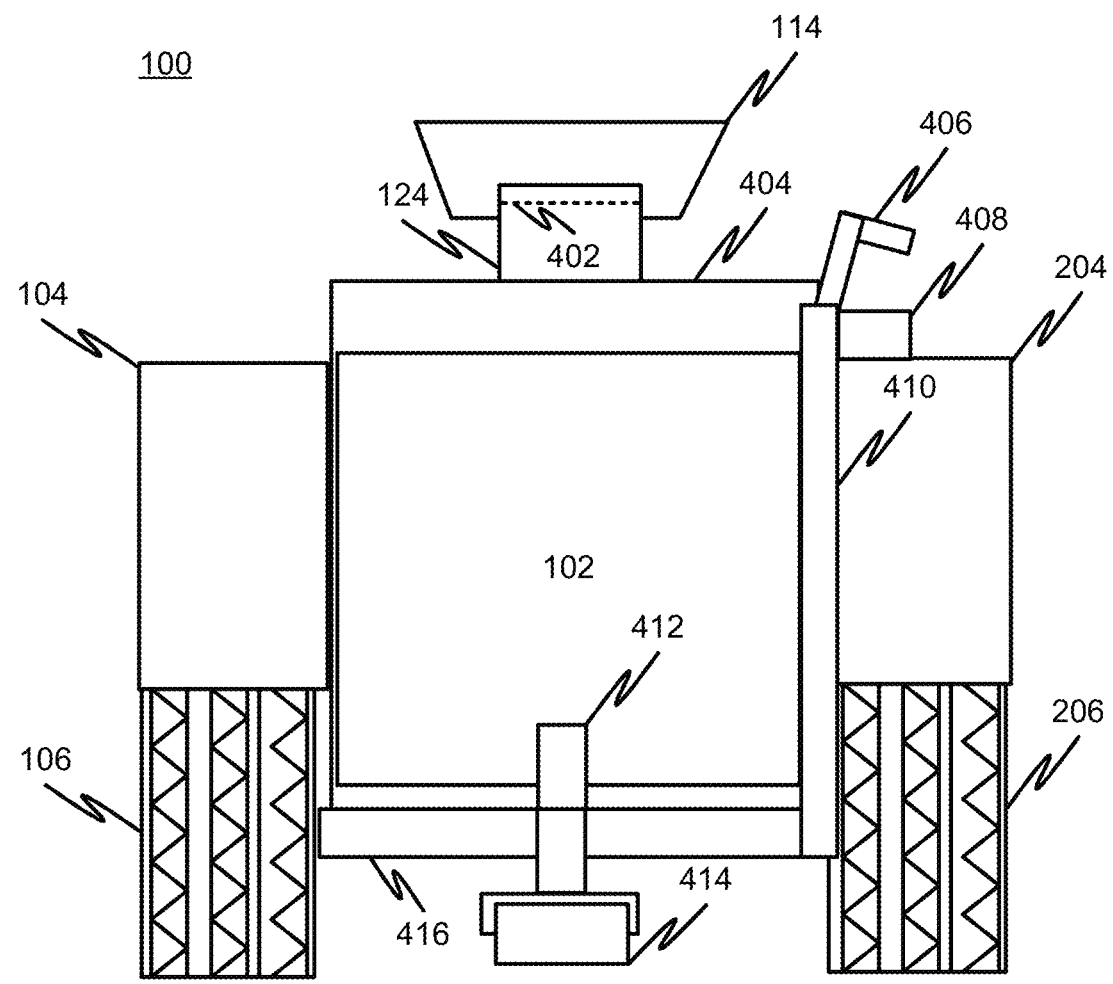
FIG. 4 is a diagram showing a back view of an example foot controlled zero turn radius stand up utility vehicle in accordance with some implementations.

FIG. 4 is a diagram showing a back view of an example foot controlled zero turn radius stand up utility vehicle in accordance with some implementations. In FIG. 4, a pivot member 402 is shown that permits the rear operator support cushion 114 to pivot in relation to the rear operator support 124. FIG. 4 also shows the rear operator support frame 404, a sprayer handle 406, a sprayer pump 408, and a spray handle holder 410 disposed adjacent to the sprayer tank 204. FIG. 4 also shows a hitch 412 and an anti-tip device 414 both attached to a lower rear portion of the utility vehicle frame.

Figure 5:
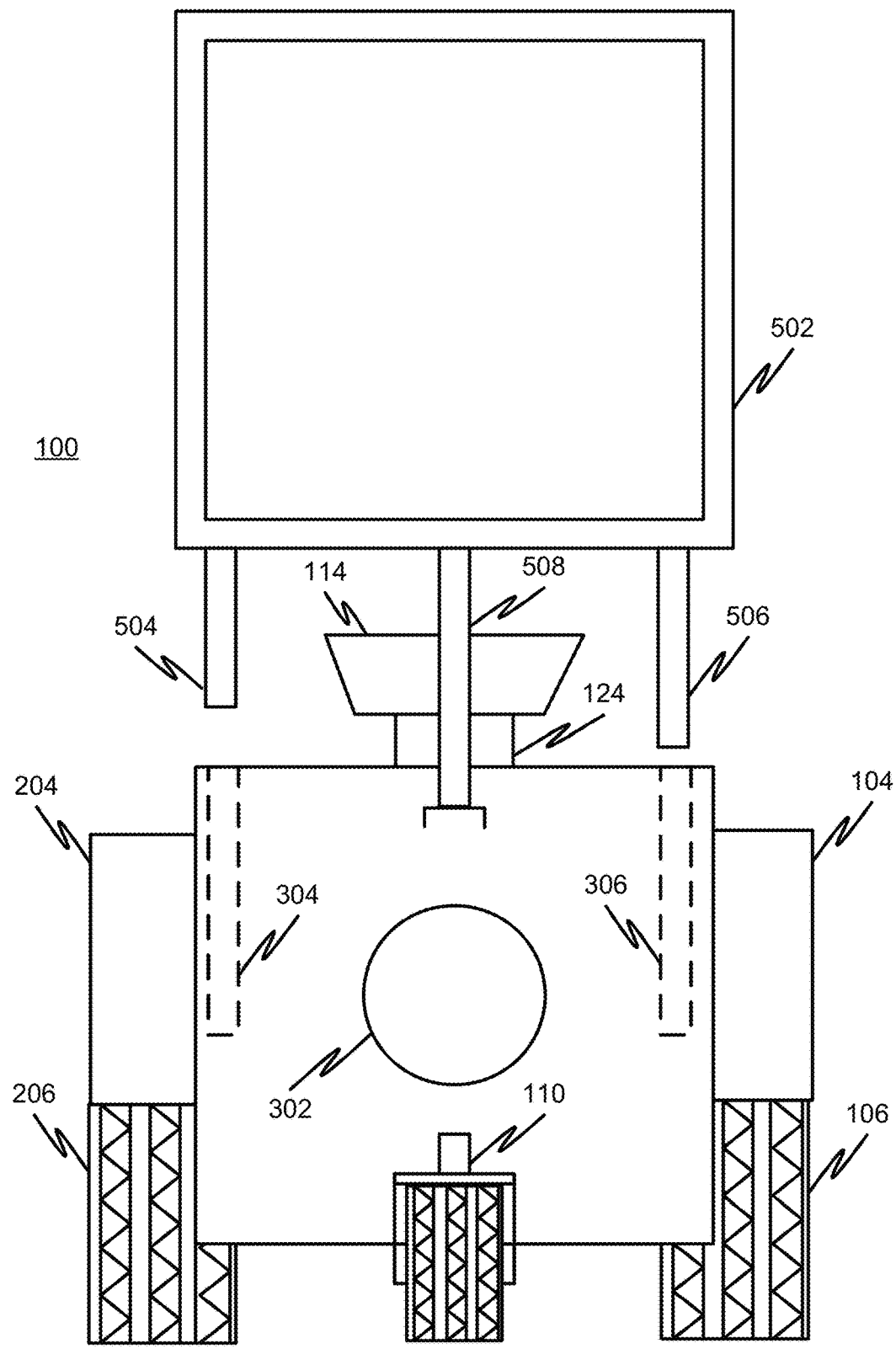
FIGS. 5-7 are diagrams showing a front view of an example foot controlled zero turn radius stand up utility vehicle with a raised standing platform being installed in accordance with some implementations.
Figure 6:
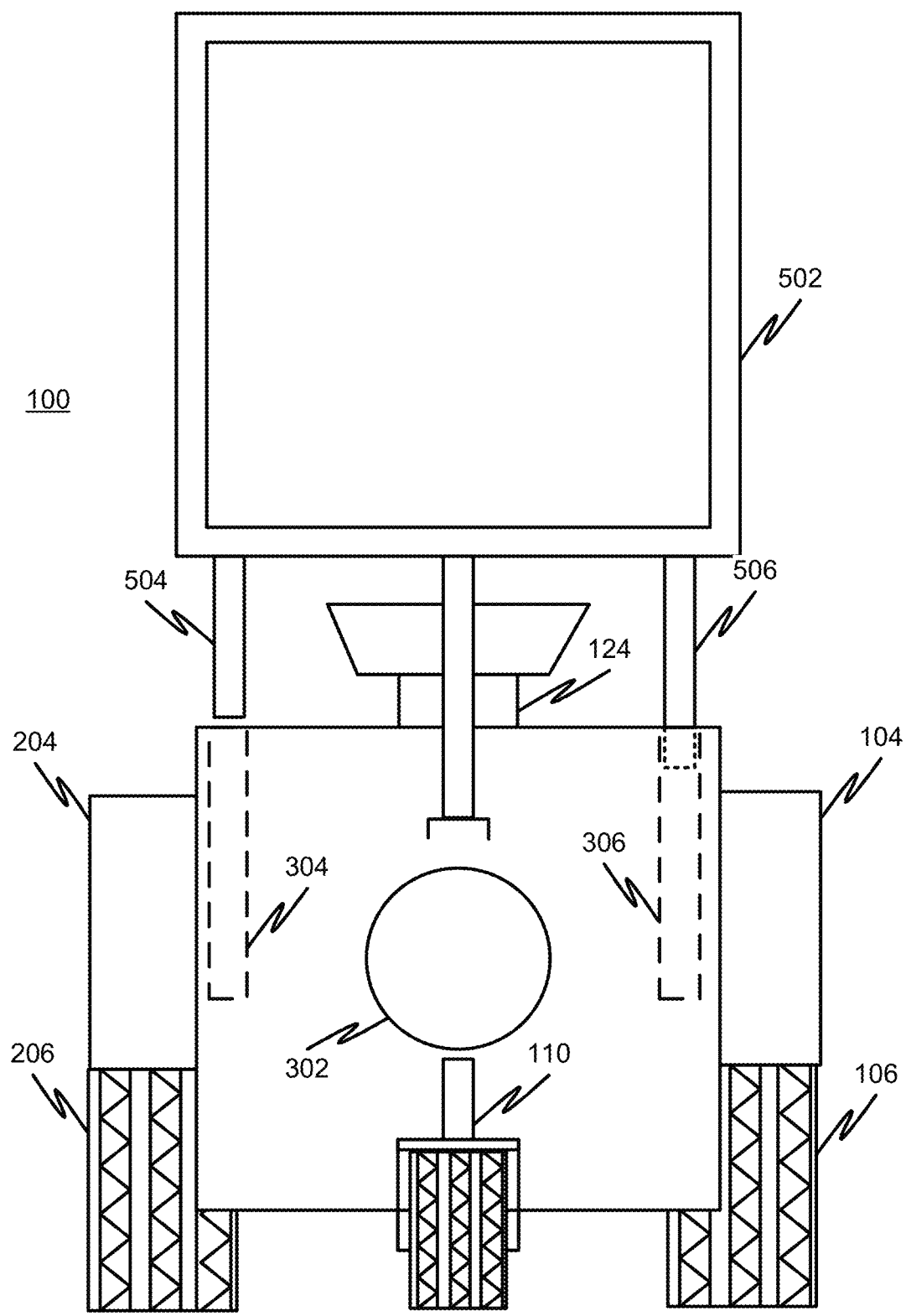
Figure 7:
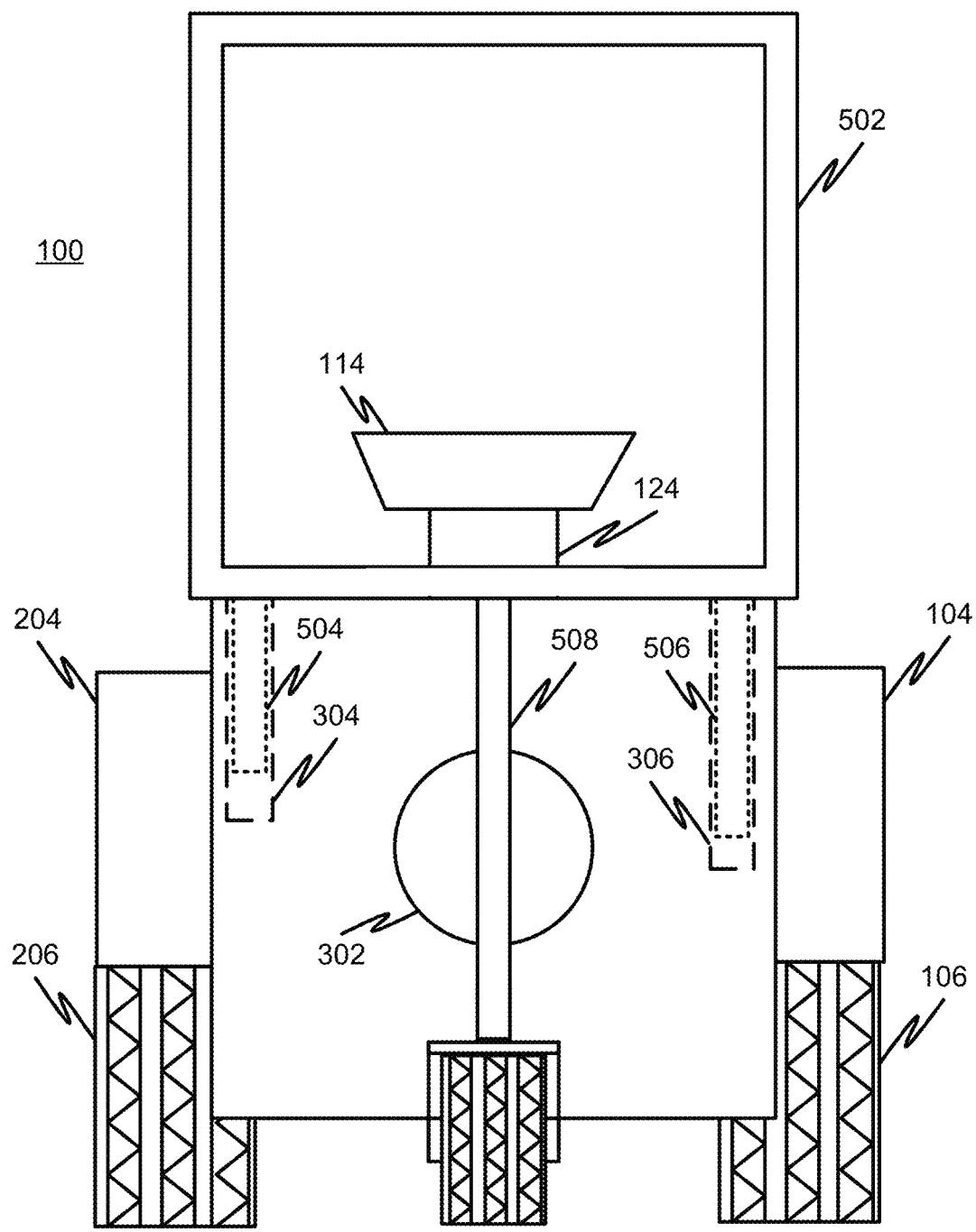
Figure 8:
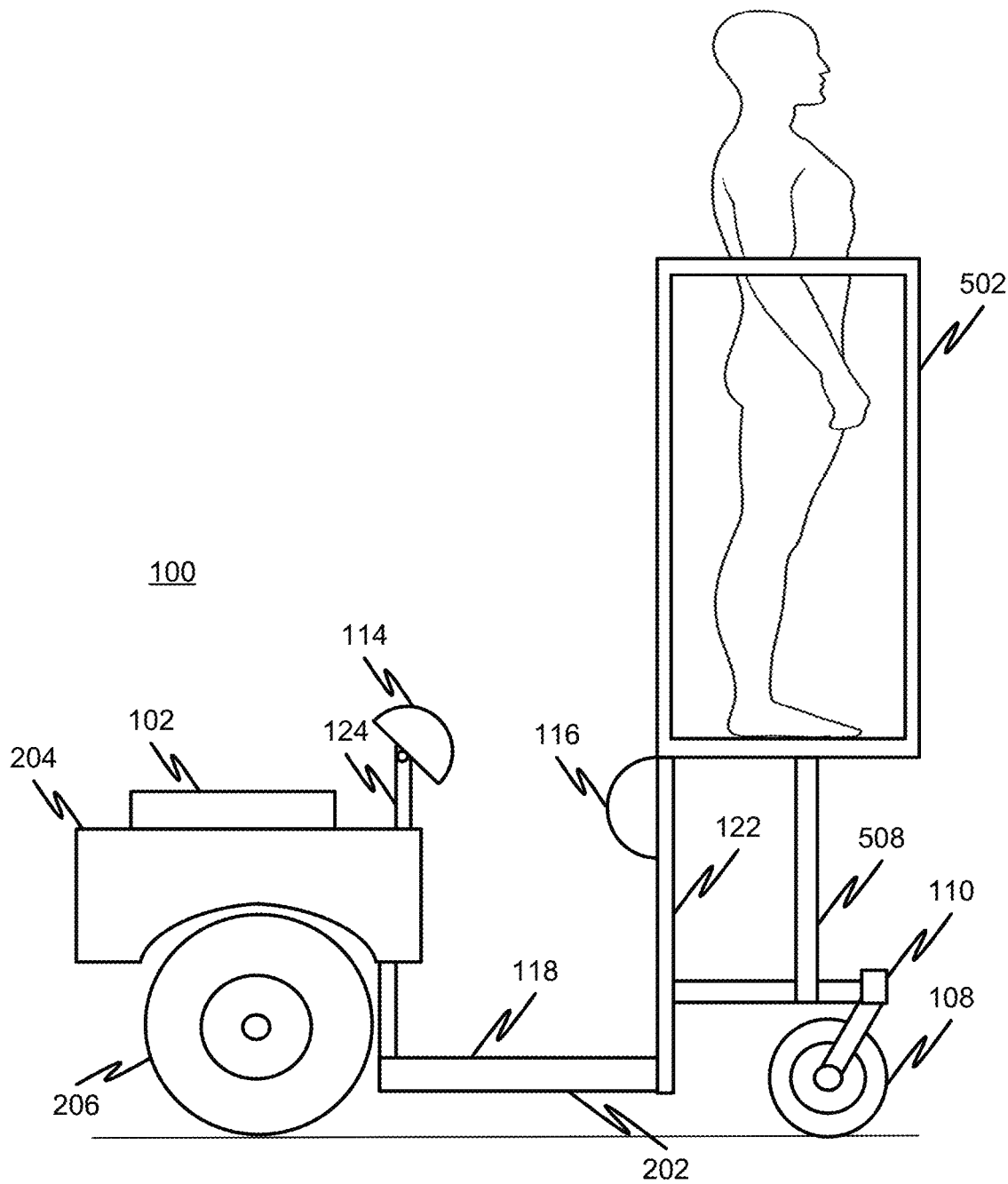
FIG. 8 is a diagram showing a side view of an example foot controlled zero turn radius stand up utility vehicle with a raised standing platform installed in accordance with some implementations.

FIGS. 5-7 are diagrams showing a front view of an example foot controlled zero turn radius stand up utility vehicle with an elevated standing platform being installed in accordance with some implementations. An elevated standing platform 502 includes a base for an operator to stand on (as shown in FIG. 8), a railing frame, and a first leg 504, a second leg 506, and an elevated standing platform support member 508. As shown in FIG. 5, the second leg 506 is longer than the first leg 504 to permit easier insertion of the legs into the corresponding recesses (304, 306) in the front operator support 122. As the elevated platform standing platform 502 is lower into position (FIG. 6), the second leg 506 engages with the recess 306 before the first leg 504 engages with its corresponding recess 304. This permits an operator to effectively attach the elevated standing platform 502 one leg at a time. The support member 508 is configured to extend downwardly and engage the front wheel support member 112 to provide additional support to the elevated platform.

FIG. 7 shows the elevated standing platform 502 fully installed with both legs (504, 506) fully inserted into corresponding recesses (304, 306).

FIG. 8 is a diagram showing a side view of an example foot controlled zero turn radius stand up utility vehicle 100 with an elevated standing platform 502 installed in accordance with some implementations and having an operator 126 standing on the platform. FIG. 8 also shows support member 508 engaged with the front wheel support member 112.

Figure 9:
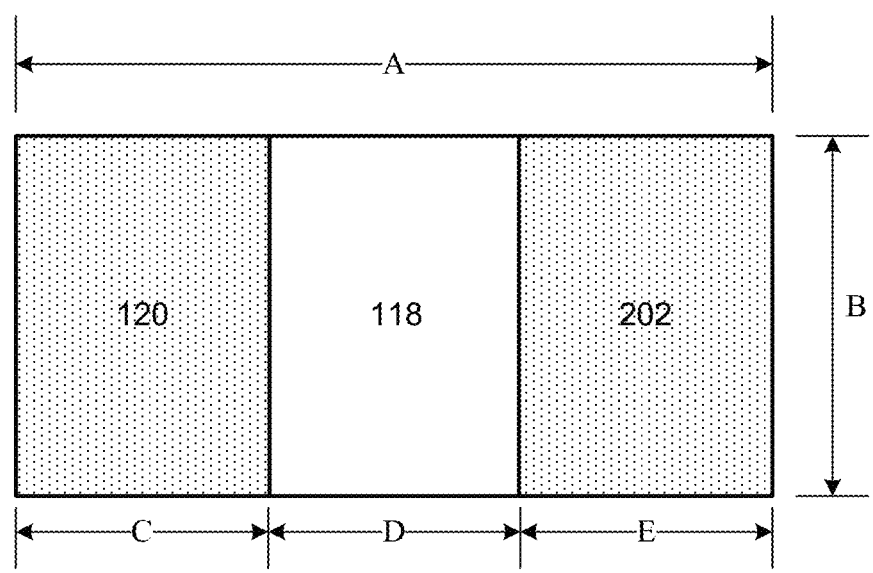
FIGS. 9 and 10 are diagrams showing details of example foot controls in accordance with some implementations.
Figure 10:
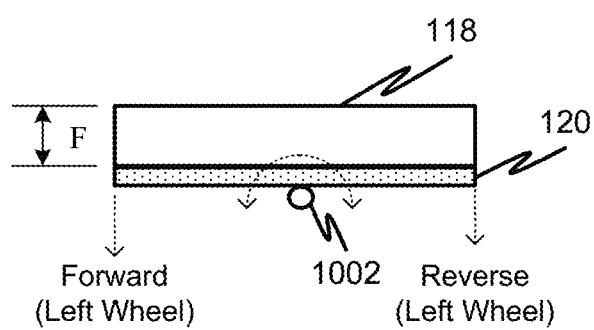

FIGS. 9 and 10 are diagrams showing details of example foot controls in accordance with some implementations. Example dimensions for the foot control section shown in FIG. 9 include an "A" dimension of about 26.25 inches, a "B" dimension of about 12.5 inches, a "C" dimension of about 7 and ⅞ inches, a "D" dimension of about 10.5 inches, and an "E" dimension of about 7 and ⅞ inches.

As shown in FIG. 10, the left foot control 120 rotates about a pivot hinge 1002 and can cause the left rear drive wheel to move in a forward direction when the foot control is pivoted in a first direction (e.g., toward the front of the utility vehicle) and in a reverse direction when the foot control is rotated in a second direction (e.g., toward the rear of the utility vehicle). The stationary section 118 has a height (dimension "F" in FIG. 10) of about 3.5 inches.

Figure 11:
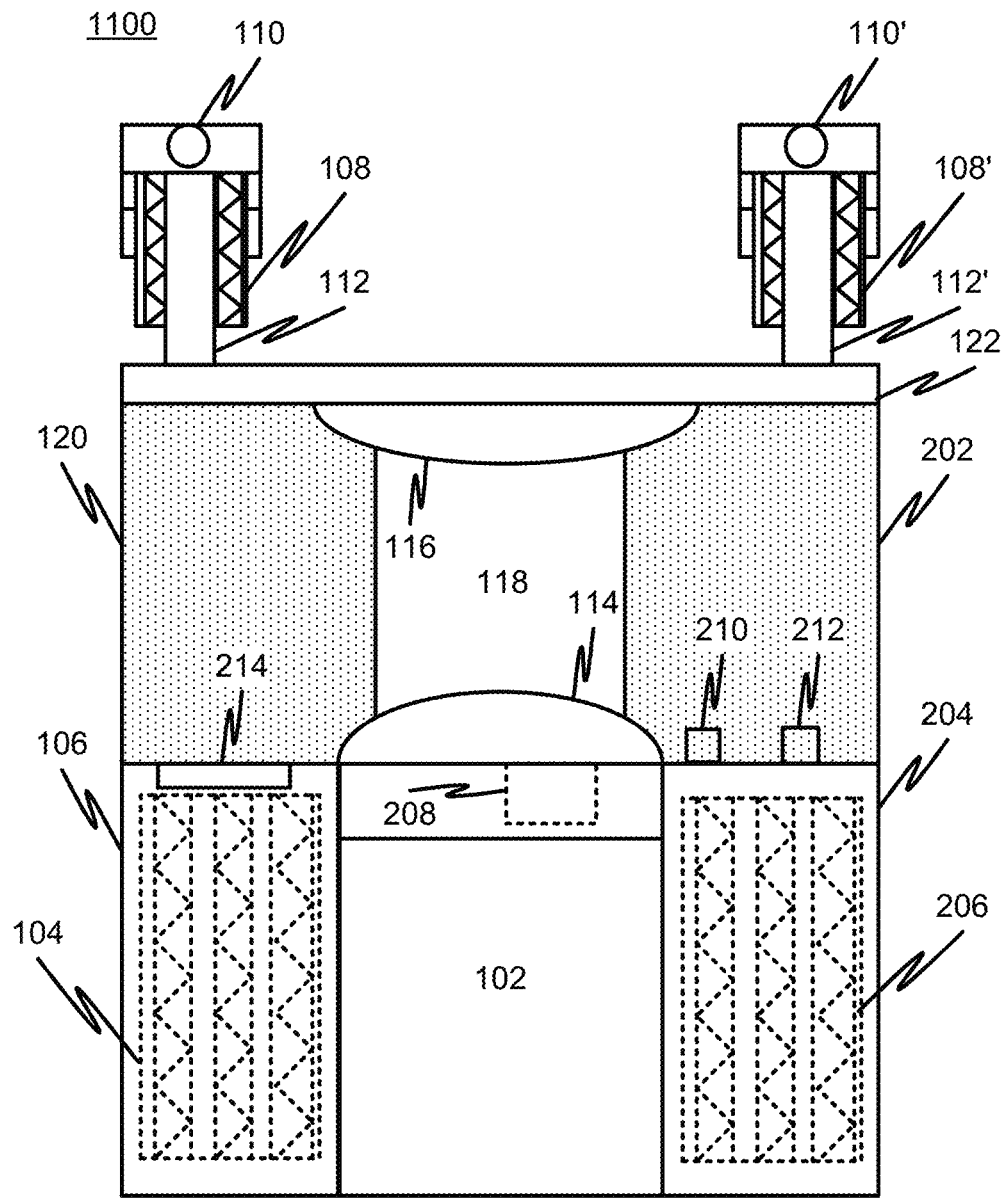
FIG. 11 is a diagram showing a top view of an example foot controlled zero turn radius stand up utility vehicle in accordance with some implementations.

FIG. 11 shows an example implementation of a foot controlled zero turn radius stand up utility vehicle 1100 having two front wheels and front wheel assemblies, which include a first front wheel assembly including a first front wheel 108, a first front wheel caster 110, a first front wheel support bracket 112, and a second front wheel assembly including a second front wheel 108', a second front wheel caster 110', a second front wheel support bracket 112'.

Figure 12:
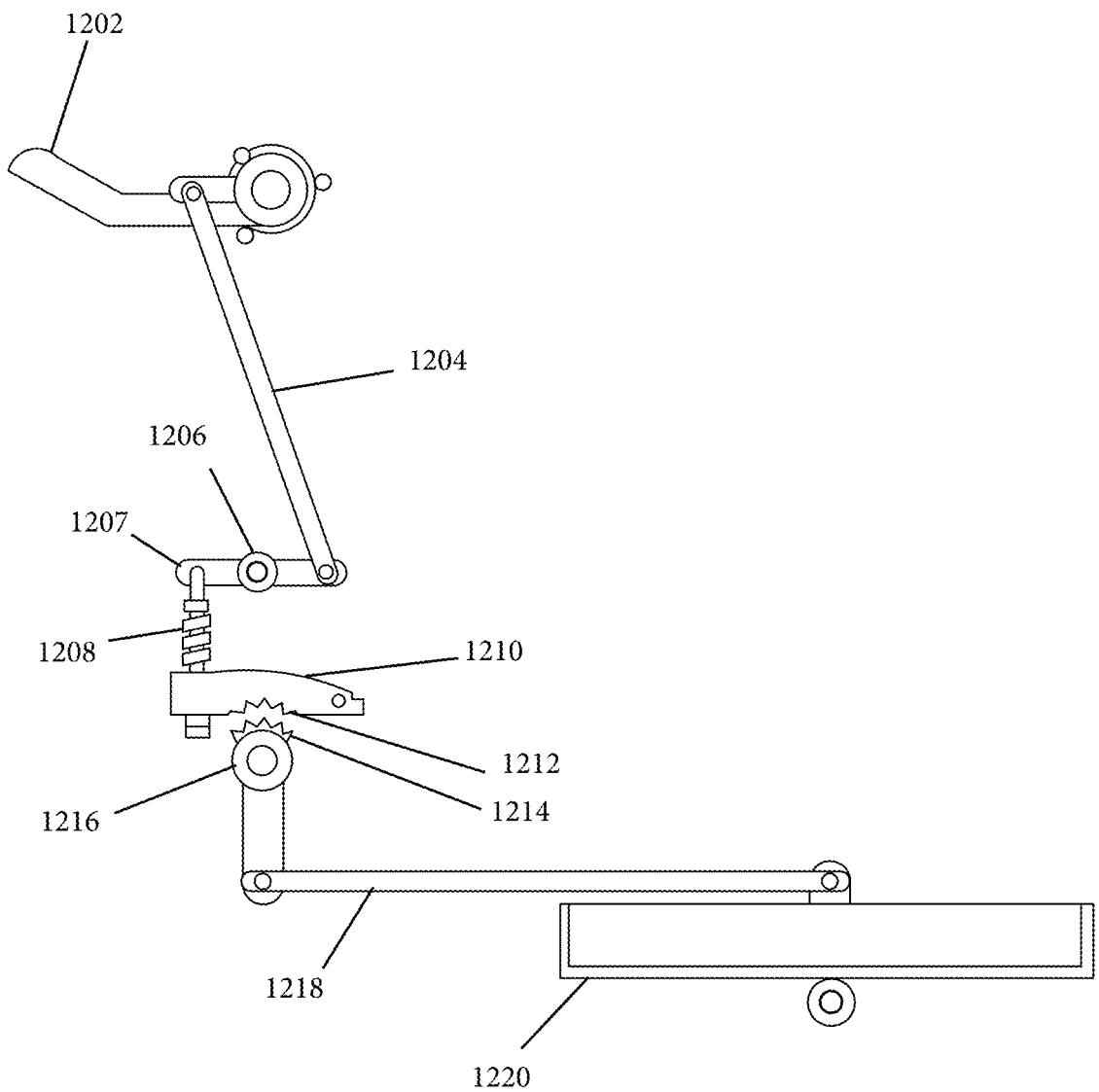
FIG. 12 is a diagram showing a side view of an example foot controlled zero turn radius stand up utility vehicle's brake locking system in the unlocked position in accordance with some implementations.
Figure 13:
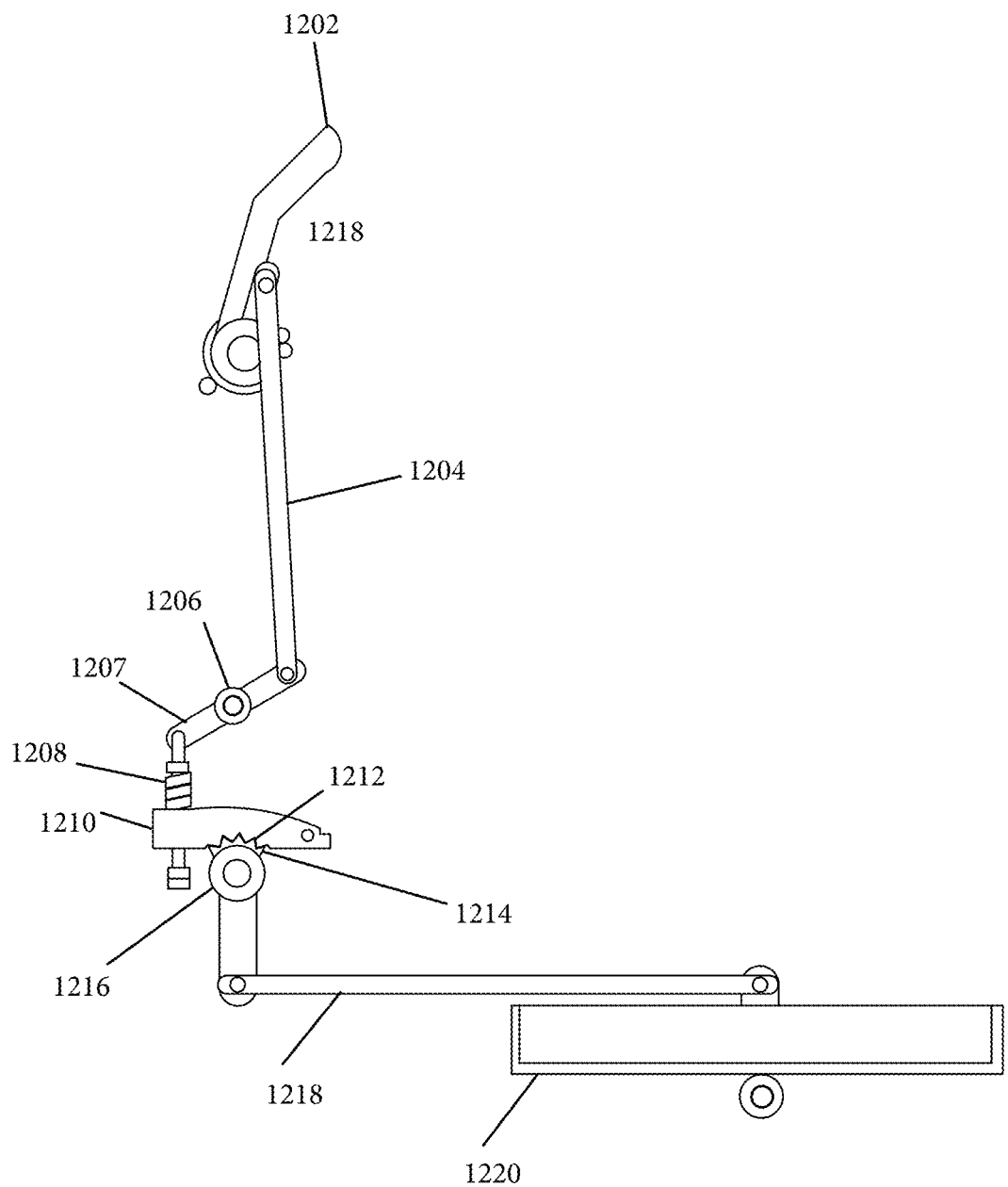
FIG. 13 is a diagram showing a side view of an example foot controlled zero turn radius stand up utility vehicle's brake locking system in the locked position in accordance with some implementations.

FIGS. 12 and 13 show an example brake locking (or foot control locking) system for a foot controlled zero turn radius stand up utility vehicle in accordance with some implementations. The brake locking system 1200 includes a brake handle 1202, a brake handle linkage 1204, a brake pivot axle 1206, a connection tab 1207, an adjustment spring 1208, a handle lock gear 1210, a handle lock gear tooth 1212, a foot control lock gear 1216, a foot control lock gear tooth 1214, a foot control linkage 1218, and a foot control 1220.

The brake locking system 1200 is engaged in the locked position when the handle lock gear tooth 1212 on the handle lock gear 1210 mates with the foot control lock gear tooth 1214 on the foot control lock gear 1216 as shown in FIG. 13 to prevent movement of the foot control and keep the foot control in a neutral position. When the foot control 1220 is in a neutral position and when the brake handle 1202 is in the locked position a switch or other control (not shown) is actuated. This completes an electrical circuit that will allow the foot controlled zero turn radius stand up utility vehicle to start.

Some implementations can include a single pin or protrusion (e.g., on 1212 or 1214) that engages with a single corresponding slot (e.g., on 1212 or 1214).

The adjustment spring 1208 allow for the brake handle 1202 to be engaged in the locked position even if the lock gear tooth 1212 and the foot control lock gear tooth 1214 are not aligned initially. With the brake handle 1202 in the locked position, pressure is applied to the handle lock gear 1210, which will engage as soon as the foot control 1220 is slightly moved and causes the tooth to align and locks the foot control 1220.

It will be appreciated that FIGS. 12 and 13 show the brake locking components for one foot control. Some implementations can include a second set of brake locking components (e.g., 1207-1220) for the other foot control, where a first set of components can be provided for the first foot control (e.g., left side) and the second set of components can be provided for the other foot control (e.g., right side). The connection tab(s) 1207 are connected to the brake pivot axle 1206 to transfer the motion from the brake handle 1202 to the other locking mechanism components.

Figure 14:
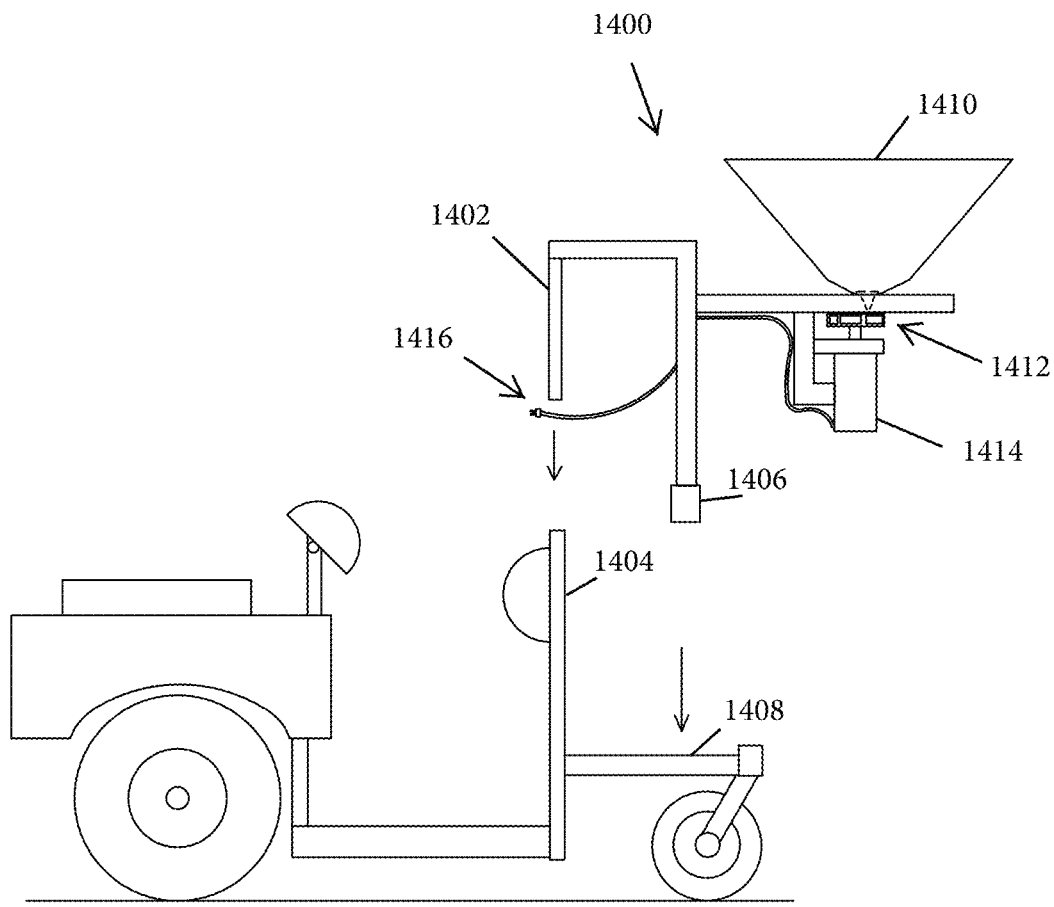
FIG. 14 is a diagram showing a side view of an example foot controlled zero turn radius stand up utility vehicle with a broadcast spreader being installed in accordance with some implementations.

FIG. 14 and shows an example foot controlled zero turn radius stand up utility vehicle with a broadcast spreader being installed in accordance with some implementations. The broadcast spreader 1400 includes an attachment tube 1402, an alignment brace 1406, a hopper 1410, an agitator 1412, a motor 1414, and a power connector 1416 (e.g., to supply power to the motor 1414).

The attachment tube 1402 on the broadcast spreader 1400 slips inside the frame 1404 of the foot controlled zero turn radius stand up utility vehicle. The alignment brace 1406 on the broadcast spreader 1400 rests on the front axle support 1408 of the foot controlled zero turn radius stand up utility vehicle. The power supplied to the broadcast spreader 1400 via the power connector 1416 can be controlled by a switch or other control (not shown) on the foot controlled zero turn radius stand up utility vehicle.

Figure 15:
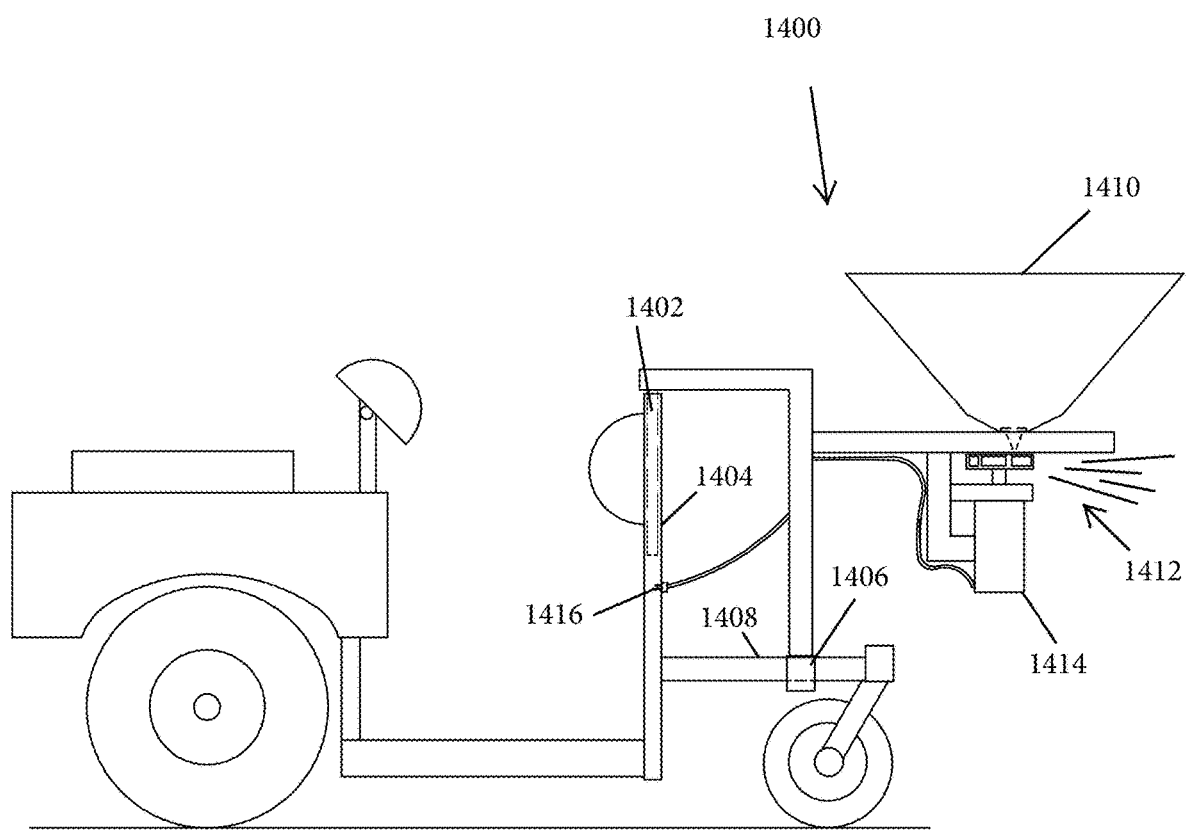
FIG. 15 is a diagram showing a side view of an example foot controlled zero turn radius stand up utility vehicle with a broadcast spreader installed in accordance with some implementations.

FIG. 15 shows an example foot controlled zero turn radius stand up utility vehicle with the broadcast spreader 1400 installed in accordance with some implementations.

Figure 16:
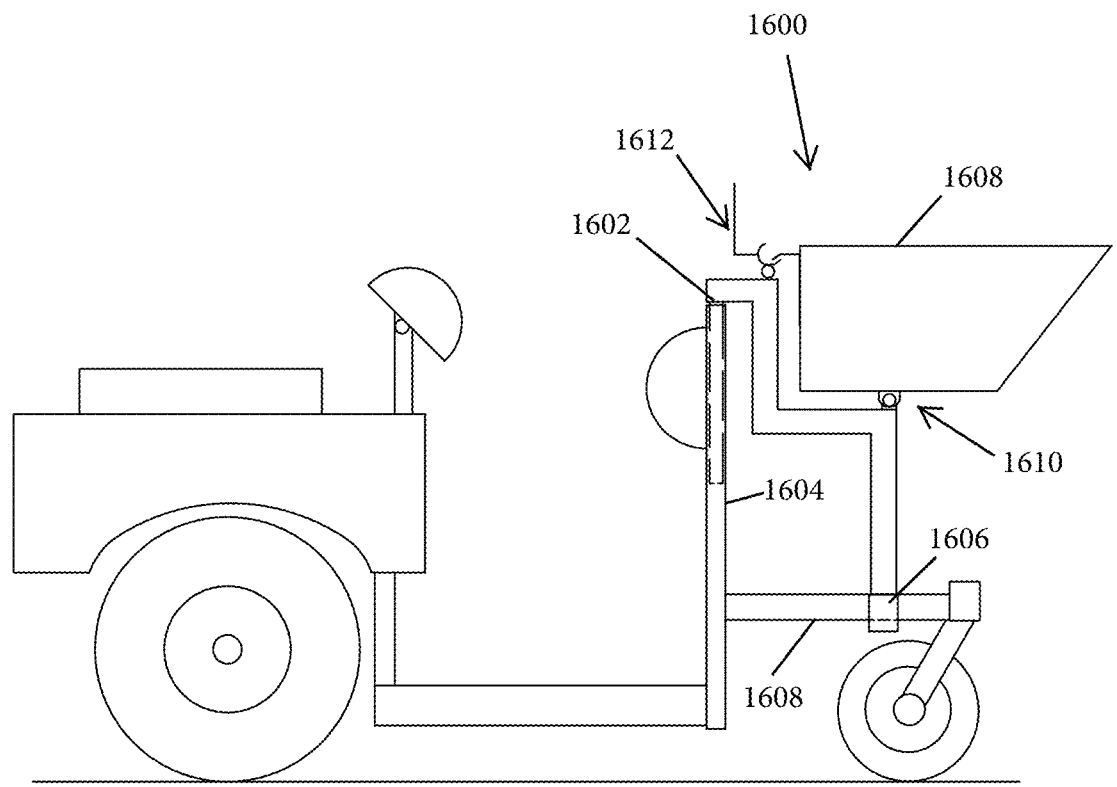
FIG. 16 is a diagram showing a side view of an example foot controlled zero turn radius stand up utility vehicle with a dump box installed in accordance with some implementations.

FIG. 16 shows an example foot controlled zero turn radius stand up utility vehicle with a dump box installed in accordance with some implementations. The dump box 1600 includes an attachment tube 1602, an alignment brace 1606, a dump box container 1608, a pivot anchor 1610, and a dump lever 1612.

The attachment tube 1602 on the dump box 1600 slips inside the frame 1604 of the foot controlled zero turn radius stand up utility vehicle. The alignment brace 1606 on the dump box 1600 rests on the front axle support 1608 of the foot controlled zero turn radius stand up utility vehicle. The dump lever 1612 can be actuated to release the dump box container 1608 so that the dump box container 1608 pivots about the pivot anchor 1610 and dumps contents out.

Figure 17:
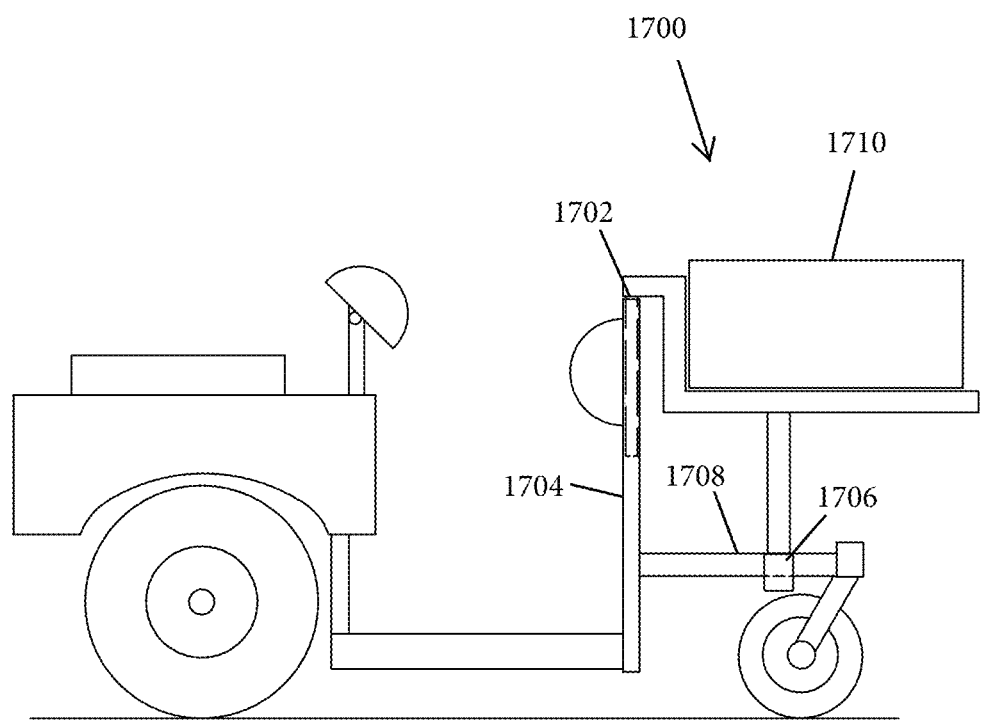
FIG. 17 is a diagram showing a side view of an example foot controlled zero turn radius stand up utility vehicle with a utility box installed in accordance with some implementations.

FIG. 17 shows an example foot controlled zero turn radius stand up utility vehicle with a utility box installed in accordance with some implementations. The utility box 1700 includes an attachment tube 1702, an alignment brace 1706, and a utility box container 1710 (e.g., for holding tools, supplies, etc.).

The attachment tube 1702 on the utility box 1700 slips inside the frame 1704 of the foot controlled zero turn radius stand up utility vehicle. The alignment brace 1706 on the utility box 1700 rests on the front axle support 1708 of the foot controlled zero turn radius stand up utility vehicle.

Figure 18:
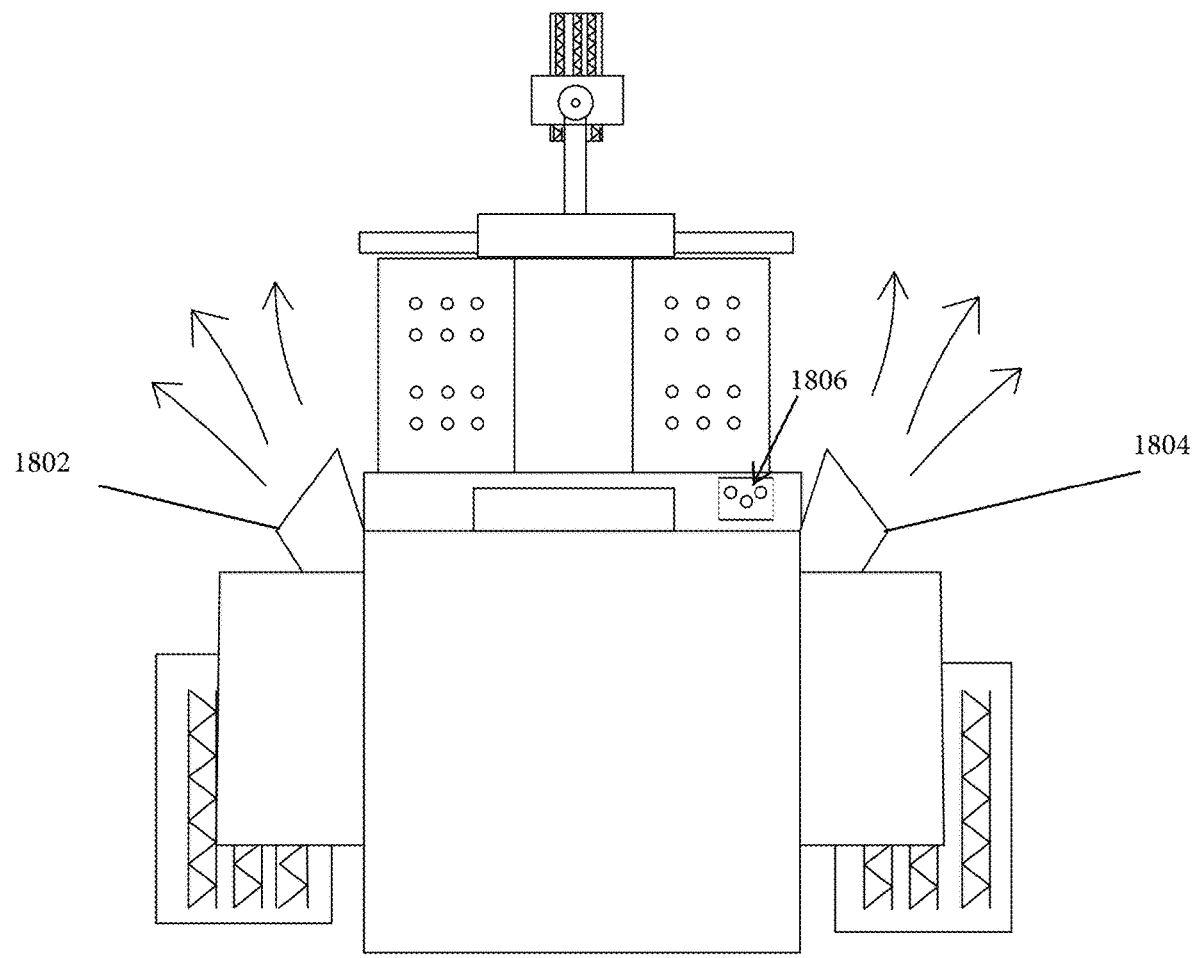
FIG. 18 is a diagram showing a top view of an example foot controlled zero turn radius stand up utility vehicle with a leaf blower installed in accordance with some implementations.

FIG. 18 shows an example foot controlled zero turn radius stand up utility vehicle with a leaf blower installed in accordance with some implementations. The leaf blower can include a left side output 1802, a right-side output 1804, and a control panel 1806.

The control panel 1806 can be configured to turn on/off one or both of the leaf blower outputs 1802/1804. The leaf blower can be operated, for example, when an operator of the foot controlled zero turn radius stand up utility vehicle is controlling the vehicle with his or her feet, using his or her hands to perform an edging operation with a handheld edger, and the leaf blower can be used to blow off the surface as the foot controlled zero turn radius stand up utility vehicle advances past an edged section of lawn or bed.

Figure 19:
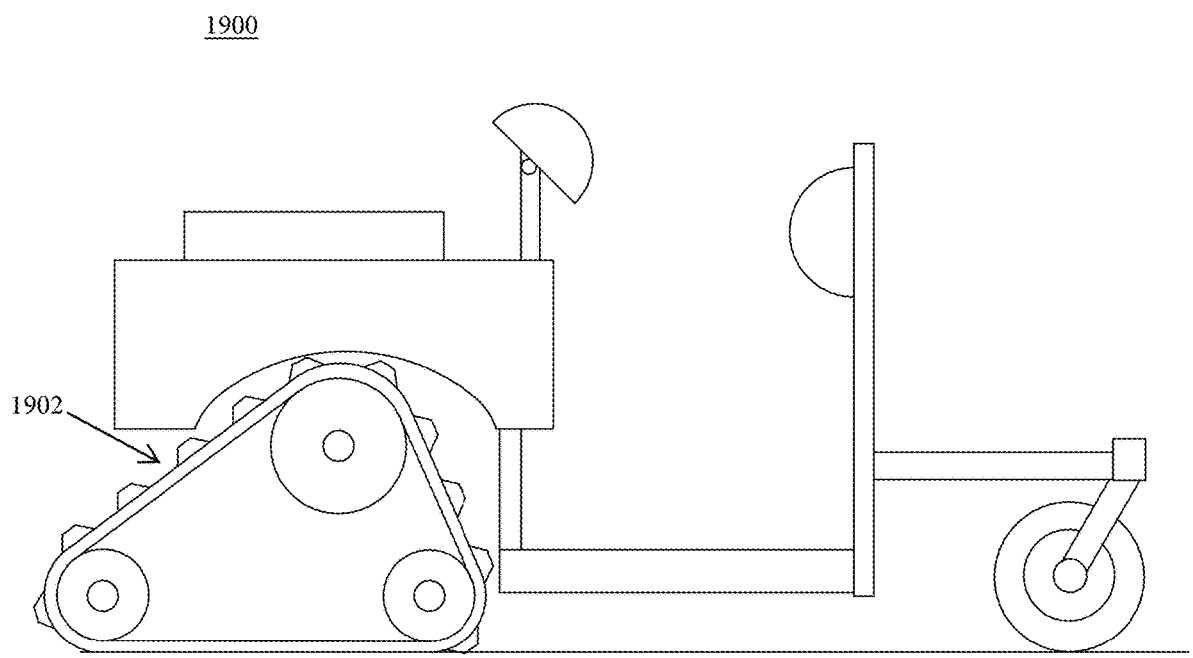
FIG. 19 is a diagram showing a side view of an example foot controlled zero turn radius stand up utility vehicle with a track drive in accordance with some implementations.

FIG. 19 is a diagram showing a side view of an example foot controlled zero turn radius stand up utility vehicle with a track drive in accordance with some implementations. In FIG. 19, the foot controlled zero turn radius stand up utility vehicle 1900 includes a track drive 1902.

Figure 20:
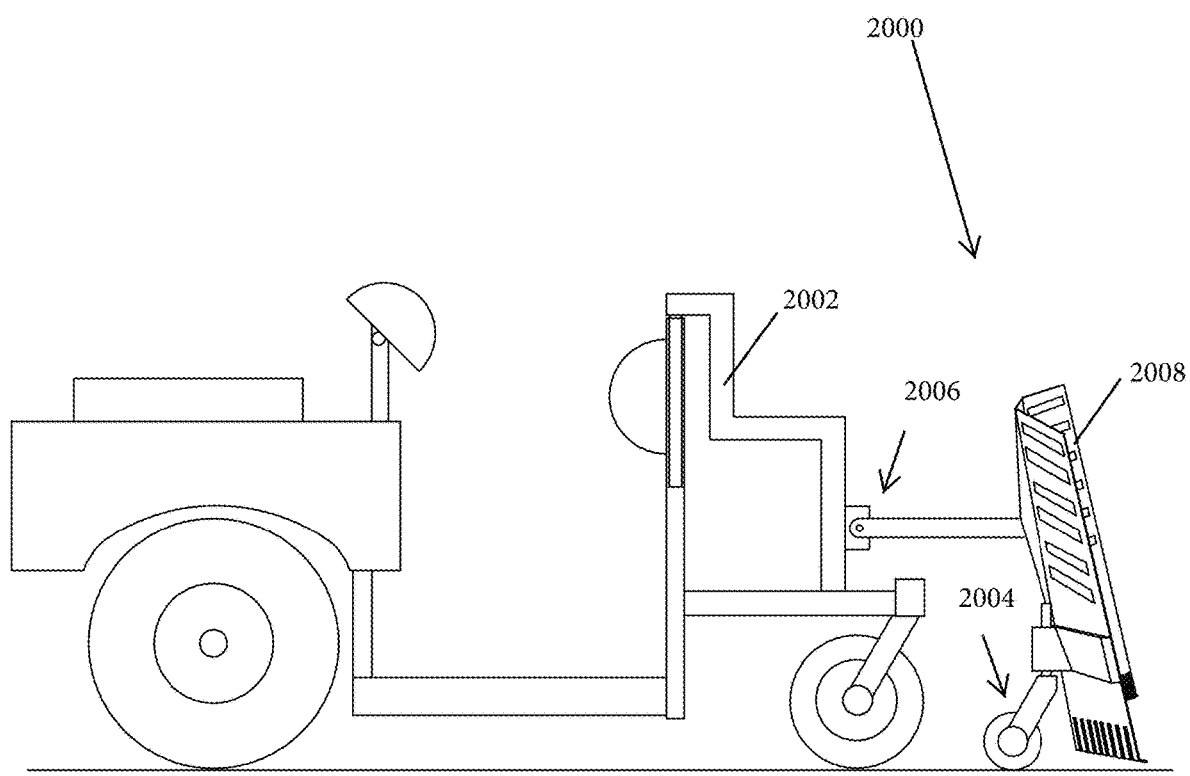
FIG. 20 is a diagram showing a side view of an example foot controlled zero turn radius stand up utility vehicle with a leaf plow attachment installed in accordance with some implementations.

FIG. 20 is a diagram showing a side view of an example foot controlled zero turn radius stand up utility vehicle with a leaf plow attachment installed in accordance with some implementations. The leaf plow attachment 2000 includes an attachment tube 2002, a leveling wheel 2004, a leveling brace 2006, and a leaf plow 2008.

It is, therefore, apparent that there is provided, in accordance with the various embodiments disclosed herein, a foot controlled zero turn radius stand up utility vehicle.

While the invention has been described in conjunction with a number of embodiments, it is evident that many alternatives, modifications and variations would be or are apparent to those of ordinary skill in the applicable arts. Accordingly, Applicant intends to embrace all such alternatives, modifications, equivalents and variations that are within the spirit and scope of the invention.

What is claimed is:

1. A utility vehicle comprising:
    a frame having at least one front caster wheel, a front operator support, a standing operation section, a rear operator support, a right rear drive wheel and a left rear drive wheel;
    an engine coupled to the frame;
    a drive system coupled to the engine and configured to independently control respective speed and rotation direction of a left rear drive wheel and a right rear drive wheel;
    a foot control section disposed in the standing operation section, wherein the foot control section includes a left foot control, a stationary center portion and a right foot control, wherein the left foot control is coupled to the drive system and is operable to control speed and rotational direction of the left rear drive wheel and the right foot control is coupled to the drive system and is operable to control speed and rotational direction of the right rear drive wheel; and
    a brake locking system to prevent movement of the left foot control or the right foot control when the brake locking system is engaged, wherein the brake locking system comprises:
        a brake handle that is coupled to locking pins or slots that align with locking pins or slots coupled to the left foot control and the right foot control,
        wherein the brake handle having a first position and a second position,
        wherein the first position locks the left foot control and the right foot control, and
        wherein the second position unlocks the left foot control and the right foot control.

2. The utility vehicle system of claim 1, further comprising a removable dump box having a dump box container, a dump lever, a pivot anchor and a dump box support member connected to the removable dump box and configured to engage a front wheel support member.

3. The utility vehicle system of claim 1, further comprising a removable utility box having a utility box container and a utility box support member connected to the removable utility box and configured to engage a front wheel support member.

4. The utility vehicle system of claim 1, further comprising a foot control section disposed in the standing operation section, wherein the foot control section includes a left foot control, a stationary center portion and a right foot control, wherein the left foot control is coupled to the drive system and is operable to control speed and rotational direction of the left rear drive wheel and the right foot control is coupled to the drive system and is operable to control speed and rotational direction of the right rear drive wheel.

5. A utility vehicle comprising:
    a frame having at least one front caster wheel, a front operator support, a standing operation section, a rear operator support, a right rear drive wheel and a left rear drive wheel;
    an engine coupled to the frame;
    a drive system coupled to the engine and configured to independently control respective speed and rotation direction of a left rear drive wheel and a right rear drive wheel;
    a foot control section disposed in the standing operation section, wherein the foot control section includes a left foot control, a stationary center portion and a right foot control, wherein the left foot control is coupled to the drive system and is operable to control speed and rotational direction of the left rear drive wheel and the right foot control is coupled to the drive system and is operable to control speed and rotational direction of the right rear drive wheel; and
    a broadcast spreader having a broadcast spreader support member, a hopper, an agitator, a motor, and a power connector, wherein the broadcast spreader support member is connected to the removable broadcast spreader and configured to engage a front wheel support member.

6. The utility vehicle of claim 5, further comprising a brake handle that is coupled to locking pins or slots that align with locking pins or slots coupled to the left foot control and the right foot control, wherein the brake handle having a first position and a second position, wherein the first position locks the left foot control and the right foot control wherein the second position unlocks the left foot control and the right foot control.

7. A utility vehicle comprising:
    a frame having at least one front caster wheel, a front operator support, a standing operation section, a rear operator support, a right rear drive wheel and a left rear drive wheel;
    an engine coupled to the frame;
    a drive system coupled to the engine and configured to independently control respective speed and rotation direction of a left rear drive wheel and a right rear drive wheel;
    a foot control section disposed in the standing operation section, wherein the foot control section includes a left foot control, a stationary center portion and a right foot control, wherein the left foot control is coupled to the drive system and is operable to control speed and rotational direction of the left rear drive wheel and the right foot control is coupled to the drive system and is operable to control speed and rotational direction of the right rear drive wheel; and a leaf blower comprising a left side output and a right side output, and a control panel, wherein the control panel is configured to turn on/off the left side output independent of the right side output; and a blower system having a left blower output, a right blower output and a control panel to control the blower system for an operating state of off, left blower only activated, right blower only activated, both left and right blower activated.

8. The utility vehicle of claim 7, further comprising a removable utility box having a utility box container and a utility box support member connected to the removable utility box and configured to engage a front wheel support member.

9. The utility vehicle of claim 7, further comprising a removable dump box having a dump box container, a dump lever, a pivot anchor and a dump box support member connected to the removable dump box and configured to engage a front wheel support member.

10. The utility vehicle of claim 7, wherein the left foot control and the right foot control are parallel to a bottom of the utility vehicle when in a neutral position, and wherein the left foot control and the right foot control are perpendicular to the front operator support and the rear operator support when in the neutral position wherein the left foot control and the right foot control are connected to the drive system.

\* \* \* \* \*